(12) United States Patent
Suzuki et al.

(10) Patent No.: US 6,940,259 B2
(45) Date of Patent: Sep. 6, 2005

(54) GENERATING DEVICE INCLUDING MAGNETO GENERATOR

(75) Inventors: Hideaki Suzuki, Numazu (JP);
Masanori Nakagawa, Numazu (JP);
Shuichi Muramatsu, Numazu (JP)

(73) Assignee: Kokusan Denki Co., Ltd., Shizuoka-Ken (JP)

( * ) Notice: Subject to any disclaimer, the term of this patent is extended or adjusted under 35 U.S.C. 154(b) by 137 days.

(21) Appl. No.: 10/697,637

(22) Filed: Oct. 30, 2003

(65) Prior Publication Data

US 2004/0085047 A1 May 6, 2004

(30) Foreign Application Priority Data

Nov. 5, 2002 (JP) ........................................ 2002-321476
Sep. 25, 2003 (JP) ........................................ 2003-333259

(51) Int. Cl.[7] .............................................. H02P 9/44
(52) U.S. Cl. ............................. 322/20; 322/28; 363/40
(58) Field of Search ............................. 322/20, 24, 27, 322/28, 45; 363/40, 56, 98; 307/45, 46

(56) References Cited

U.S. PATENT DOCUMENTS

| | | | | |
|---|---|---|---|---|
| 5,719,484 A | * | 2/1998 | Taniguchi et al. | 322/20 |
| 5,726,558 A | * | 3/1998 | Umeda et al. | 322/27 |
| 5,739,677 A | * | 4/1998 | Tsutsui et al. | 322/25 |
| 6,154,379 A | * | 11/2000 | Okita | 363/40 |
| 6,713,888 B2 | * | 3/2004 | Kajiura | 290/40 F |
| 6,850,426 B2 | * | 2/2005 | Kojori et al. | 363/123 |
| 6,856,040 B2 | * | 2/2005 | Feddersen et al. | 290/44 |

FOREIGN PATENT DOCUMENTS

JP    11-046456    2/1999

* cited by examiner

*Primary Examiner*—Nicholas Ponomarenko
(74) *Attorney, Agent, or Firm*—Pearne & Gordon LLP

(57) ABSTRACT

A generating device including a magneto generator, wherein: an AC control voltage is applied to an armature coil of the magneto generator from a battery via an inverter to change a phase angle of the AC control voltage, thus increase/reduce an output of the magneto generator and match the output of the generator with a target value; it is determined that a characteristic, in which the output of the magneto generator increases when the phase angle of the AC control voltage is delayed, is a normal control characteristic, and a characteristic, in which the output of the magneto generator decreases when the phase angle of the AC control voltage is delayed, is a reciprocal control characteristic; and it is determined whether a present control characteristic of the output of the generator relative to the phase angle of the AC control voltage is the normal control characteristic or the reciprocal control characteristic to decide, based on a determination result, a changing direction of the phase angle of the AC control voltage when the output of the generator is controlled and brought close to the target value.

5 Claims, 9 Drawing Sheets

GENERATING DEVICE INCLUDING MAGNETO GENERATOR

TECHNICAL FIELD OF THE INVENTION

The present invention relates to a generating device including a circuit that converts an AC output of a magneto generator into a DC output.

BACKGROUND OF THE INVENTION

As is well known, a magneto generator is comprised of a magnet rotor that produces a magnetic field by mounting a permanent magnet to a rotor yoke, and a stator including an armature coil wound around an armature core having a magnetic pole portion facing a magnetic pole of the magnet rotor.

The magnet rotor is mounted to a rotational axis of a prime mover, and the stator is secured to a predetermined mounting portion provided on a casing or a cover of the prime mover, so that the magnetic pole portion provided on the armature core faces a magnetic pole portion of the magnet rotor with a predetermined gap therebetween.

In the magneto generator, the magnetic field of the magnet rotor is produced by the permanent magnet, and thus the magnetic field cannot be controlled by a method similar to that for a magneto generator having field winding to control an output of the magneto generator.

The applicant proposes, as described in Japanese Patent Application Laid-Open Publication No. 11-46456, a generating device that is comprised so as to apply an AC control voltage to an armature coil from voltage accumulation means such as a battery or a capacitor provided on a load side via an inverter, wherein a phase of the AC control voltage is changed to change a magnetic flux linking the armature coil and change an output characteristic of a magneto generator.

In the magneto generator, when an AC control voltage having the same frequency as an induced voltage of the armature coil is applied to the armature coil to change a phase angle of the AC control voltage to a delayed side relative to a phase of a no-load induced voltage of the armature coil, an output of the magneto generator can be generally increased, and when the phase angle of the AC control voltage is changed to an advanced side, the output of the magneto generator can be reduced. The phase angle of the AC control voltage relative to the phase of the no-load induced voltage of the armature coil is referred to as a "control angle."

Thus, depending on whether the output of the magneto generator (an output voltage or an output current) is lower or higher than a target value, the control angle is changed to the delayed side or the advanced side to allow control for matching the output of the magneto generator with the target value.

Such control that a generating device is comprised so as to apply the AC control voltage to the armature coil of the magneto generator from the voltage accumulation means provided on the load side via the inverter, and the phase angle of the AC control voltage is controlled to adjust the output of the magneto generator is referred to as "drive control", which means controlling the output of the magneto generator while driving the magneto generator from the load side.

The generating device proposed in Japanese Patent Application Laid-Open Publication No. 11-46456 includes: a magneto generator having a magnet rotor with a magnetic field, and a stator having an armature coil wound around an armature core with a magnetic pole portion facing a magnetic pole of the magnetic field, the magnet rotor being driven by an internal combustion engine; an AC/DC conversion circuit having an AC/DC converter that converts an m-phase AC output voltage obtained from the magneto generator into a DC voltage to apply the DC voltage to voltage accumulation means such as a battery or a capacitor, and an inverter that converts a voltage across the voltage accumulation means into an AC voltage to apply the AC voltage to the armature coil; and a controller that controls the inverter so as to apply an AC voltage having the same frequency as a present induced voltage of the armature coil as an AC control voltage to the armature coil from the voltage accumulation means via the inverter.

The controller controls the inverter so as to apply the AC control voltage having the same frequency as the induced voltage of the armature coil to the armature coil from the voltage accumulation means such as the battery provided on the load side via the inverter when the output of the magneto generator deviates from the target value, and change the phase angle of the AC control voltage to the advanced side or the delayed side relative to a present phase angle to control and bring the output of the magneto generator close to the target value. Thus, changing the phase angle of the AC control voltage to the advanced side or the delayed side relative to the present phase angle is equivalent to controlling the control angle of the AC control voltage.

As a regulator that controls an output of a magneto generator, a short circuit type regulator has been often used such that the output of the magneto generator is short-circuited when an output voltage exceeds a target value. However, when the short circuit type regulator is used, a high short circuit current passes through an armature coil when the output of the magneto generator is adjusted, which may increase heat generation from the armature coil or heat generation in a switch element that constitutes the regulator.

On the other hand, if the output of the magneto generator is adjusted by drive control, the output of the magneto generator can be adjusted without passing the short circuit current, which can prevent an increase in temperature of the armature coil of the magneto generator or an increase in temperature of the switch element during adjustment of the output.

However, it is revealed that when the control angle is changed to the delayed side at a fixed rotational speed of the magneto generator, and the control angle is delayed to some extent, the output of the magneto generator stops increasing, and the output of the magneto generator decreases for further delay. Similarly, it is revealed that when the control angle is changed to the advanced side at a fixed rotational speed of the magneto generator, and the control angle is advanced to some extent, the output of the magneto generator stops decreasing, and the output of the magneto generator increases for further delay.

Therefore, when there is a large difference between the output of the generator and the target value in the drive control, and the control angle is changed to the delayed side, a relationship between a changing direction of the control angle and a changing direction of the output of the magneto generator is reversed during the control to reduce the output of the magneto generator with the delay of the control angle. Such a state causes the control angle to continue changing to the delayed side, and prevents the output of the generator from converging to the target value. Similarly, when the control angle is advanced to control and restrain the output of the magneto generator, excessively changing the control angle to the advanced side causes an increase in the output of the magneto generator with the change of the control angle during the control, and prevents the output of the generator from converging to the target value.

SUMMARY OF THE INVENTION

Thus, an object of the present invention is to provide a generating device that can properly control an output of a magneto generator without causing an abnormal state in which an output of the generator is prevented from converging to a target value.

The present invention is applied to a generating device including: a magneto generator having a magnet rotor, and a stator having an m-phase armature coil (m is an integer equal to or more than 1) wound around an armature core with a magnetic pole portion facing a magnetic pole of the magnet rotor; an AC/DC conversion circuit having an AC/DC converter that converts an m-phase AC output voltage obtained from the magneto generator into a DC voltage to apply the DC voltage to voltage accumulation means, and an inverter that converts a voltage across the voltage accumulation means into an m-phase AC voltage to apply the AC voltage to the armature coil; and a controller that controls the inverter so as to apply an AC control voltage having the same frequency as an induced voltage of the armature coil to the armature coil from the voltage accumulation means via the inverter, and change a phase angle of the AC control voltage to control and bring an output of the magneto generator close to a target value.

In the invention, the controller includes: control characteristic determination means that determines whether a present control characteristic relative to the phase angle of the AC control voltage of the output of the magneto generator is a normal control characteristic or a reciprocal control characteristic; phase angle decision means that changes the phase angle of the AC control voltage in a direction of bringing the output of the magneto generator close to the target value depending on a determination result of the control characteristic determination means to decide a new phase angle of the AC control voltage; and inverter control means that controls the inverter so as to apply the AC control voltage having the phase angle decided by the phase angle decision means to the armature coil.

The control characteristic determination means determines that a control characteristic, in which the output of the magneto generator increases when the phase angle of the AC control voltage is changed to a delayed side relative to a present phase angle, and the output of the magneto generator decreases when the phase angle of the AC control voltage is changed to an advanced side relative to the present phase angle, is the normal control characteristic, and a control characteristic, in which the output of the magneto generator decreases when the phase angle of the AC control voltage is changed to the delayed side relative to the present phase angle, and the output of the magneto generator increases when the phase angle of the AC control voltage is changed to the advanced side relative to the present phase angle, is the reciprocal control characteristic, and determines whether the present control characteristic relative to the phase angle of the AC control voltage of the output of the magneto generator is the normal control characteristic or the reciprocal control characteristic.

As described above, in the invention, the means for determining whether the present control characteristic relative to the phase angle of the AC control voltage of the output of the magneto generator is the normal control characteristic or the reciprocal control characteristic is provided to decide, depending on the determination result, the phase angle of the AC control voltage when the output of the magneto generator is brought close to the target value. Thus, for the normal control characteristic, the phase angle of the AC control voltage is changed to the delayed side when the output of the magneto generator is lower than the target value, and the phase angle of the AC control voltage is changed to the advanced side when the output of the magneto generator is higher than the target value, to bring the output of the magneto generator close to the target value. For the reciprocal control characteristic, the phase angle of the AC control voltage is changed to the advanced side when the output of the magneto generator is lower than the target value, and the phase angle of the AC control voltage is changed to the delayed side when the output of the magneto generator is higher than the target value, to bring the output of the magneto generator close to the target value.

Therefore, the invention prevents abnormal states in which the phase angle of the AC control voltage continues changing to the delayed side and cannot return to the normal control when the control characteristic changes from the normal control characteristic to the reciprocal control characteristic during a process of controlling and increasing the output of the magneto generator to the target value, or the phase angle of the AC control voltage continues changing to the advanced side and cannot return to the normal control when the control characteristic changes from the normal control characteristic to the reciprocal control characteristic during a process of controlling and reducing the output of the magneto generator to the target value. Thus, the present invention always allows proper control of the output of the magneto generator by the control angle.

In a preferred aspect of the invention, the generating device further includes a signal generating device of a magnetic flux change detection type having means for changing a magnetic flux when a rotational angle position of the magnet rotor matches a predetermined rotational angle position, and a coil that detects the change of the magnetic flux to generate pulses, and the controller further includes control voltage zero point detection means that regards each zero point of the AC control voltage having the phase angle decided by the phase angle decision means as a target zero point, and detects each target zero point with reference to a timing at which the signal generating device generates a specific pulse.

In this case, the inverter control means is comprised so as to control the inverter to apply an AC voltage having each zero point matching each target zero point detected by the control voltage zero point detection means to the armature coil from the voltage accumulation means.

The signal generating device of the magnetic flux change detection type may be comprised of, for example, a reluctor provided in the magnet rotor, and a signal generator that generates pulses when detecting an edge of the reluctor. The signal generator may be comprised of a core having a magnetic pole portion facing the reluctor, a signal coil wound around the core, and a permanent magnet magnetically coupled to the core.

The signal generating device of the magnetic flux change detection type can be comprised without a semiconductor sensor susceptible to heat such as a hall element, and thus when the magneto generator is provided in a cover of an internal combustion engine, the signal generating device can be housed in the cover together with the magneto generator.

In the above described construction, whether the present control characteristic is the normal control characteristic or the reciprocal control characteristic is determined from a changing direction of the control angle and a changing direction of the output of the magneto generator. However, the characteristic of the magneto generator may be previously checked to prepare data for providing a relationship between a rotational speed and the control characteristic of the magneto generator, and based on the data, the control angle may be controlled so as to prevent the control characteristic from becoming the reciprocal control characteristic.

In such a construction, the controller includes: phase angle decision means that changes the phase angle of the AC control voltage to a delayed side when the output of the magneto generator is lower than the target value, and changes the phase angle of the AC control voltage to an advanced side when the output of the magneto generator is higher than the target value, to decide a new phase angle of the AC control voltage; inverter control means that controls the inverter so as to apply the AC control voltage having the phase angle decided by the phase angle decision means to the armature coil; limit data map storage means that stores a limit data map providing a relationship between an advanced side limit value and a delayed side limit value within a normal phase angle changing range of the phase angle of the AC control voltage and a rotational speed of the magnet rotor; rotational speed detection means that detects a rotational speed of the magneto generator; and limit data map search means that obtains an advanced side limit value and a delayed side limit value of a phase angle at a rotational speed detected by searching the limit data map for the rotational speed detected by the rotational speed detection means. In this case, the phase angle decision means is comprised so as to decide a new phase angle of the AC control voltage only when the phase angle of the AC control voltage is between the advanced side limit value and the delayed side limit value.

The normal phase angle changing range described above is a changing range of the phase angle of the AC control voltage in which a relationship, such that when the phase angle of the AC control voltage is changed to the delayed side relative to the present phase angle, the output of the magneto generator increases, and when the phase angle of the AC control voltage is changed to the advanced side relative to the present phase angle, the output of the magneto generator decreases, is met between a changing direction of the phase angle of the AC control voltage and a changing direction of the output of the magneto generator.

BRIEF DESCRIPTION OF THE DRAWINGS

The above and other objects and features of the invention will be apparent from the detailed description of the preferred embodiments of the invention, which are described and illustrated with reference to the accompanying drawings, in which.

DETAILED DESCRIPTION OF THE PREFERRED EMBODIMENTS

Figure 1:
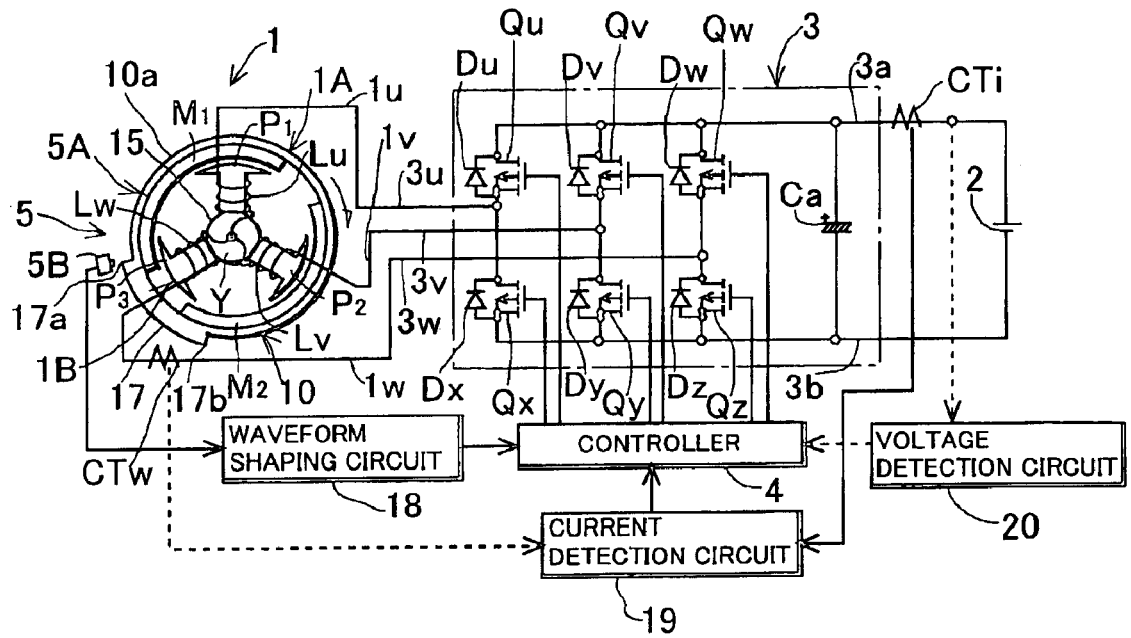
FIG. 1 is a schematic circuit diagram of a construction example of hardware of a generating device according to the invention.

Now, embodiments of the invention will be described with reference to the drawings. FIG. 1 shows an entire construction of an embodiment according to the invention when a magneto generator having a stator with a three-phase armature coil is used. In FIG. 1, a reference numeral 1 denotes a magneto generator driven by an internal combustion engine; 2, a battery; 3, an AC/DC conversion circuit provided between the magneto generator 1 and the battery 2; 4, a controller that has a microprocessor and controls an inverter provided in the AC/DC conversion circuit 3; and 5, a signal generating device that generates pulses when a rotational angle position of a magnet rotor of the magneto generator 1 matches a predetermined position.

More specifically, in FIG. 1, a reference numeral 10 denotes a rotary yoke made of a ferromagnetic material such as iron and formed into a substantial cup shape, and the rotary yoke is mounted to the internal combustion engine (not shown in FIG. 1), with a boss mounted to a center of a bottom wall of the rotary yoke being fitted to a crankshaft of the engine.

In the magneto generator, a permanent magnet is mounted to an inner periphery of a peripheral wall 10a of the rotor yoke 10 to produce a magnetic field with 2n poles (n is an integer equal to or more than 1). In the embodiment, two arcuate permanent magnets M1 and M2 placed at a 180° interval are mounted to the inner periphery of the peripheral wall 10a of the rotary yoke 10 by bonding or the like, and the permanent magnets are radially polarized in different polarizing directions to produce the magnetic field with two poles on the inner periphery of the rotor yoke. A magnet rotor 1A of the magneto generator is comprised of the rotor yoke 10 and the permanent magnets M1 and M2. In this embodiment, the magnet rotor 1A is rotated clockwise in FIG. 1 during a forward rotation of the internal combustion engine.

A stator 1B is placed inside the magnet rotor 1A. The stator 1B is comprised of an annular star type armature core 15 having a structure in which three salient poles P1 to P3 radially protrude from an outer periphery of an annular yoke Y, and a three-phase armature coil Lu to Lw wound around the salient poles P1 to P3 of the armature core. In the shown embodiment, the three-phase armature coil Lu to Lw wound around the salient poles P1 to P3 is star connected, and a three-phase output terminal 1u, 1v and 1w is drawn from an end opposite a neutral point of the armature coil.

The stator 1B is secured to a stator mounting portion formed on a part of a casing of the internal combustion engine, and a magnetic pole portion formed on a tip of each of the salient poles P1 to P3 faces a magnetic pole of a magnetic field of the magnet rotor 1A with a predetermined gap therebetween.

A reluctor 17 constituted by an arcuate protrusion extending circumferentially of the peripheral wall 10a is formed on an outer periphery of the peripheral wall 10a of the rotor yoke 10, and a signal generating rotor 5A is comprised of the reluctor 17 and the rotor yoke 10. A pulser 5B that generates pulses when an edge of the reluctor 17 is detected is placed on the side of the rotor 5A, and the signal generating device 5 is comprised of the signal generating rotor 5A and the pulser 5B.

The pulser 5B is secured to the casing or the like of the engine. When a rotational angle position of the magnet rotor (a rotational angle position of a crankshaft of the engine) matches a preset first position, the pulser 5B detects a leading edge in a rotational direction of the reluctor 17 to generate a first pulse more than a threshold, and when the rotational angle position matches a second position used as an ignition point during a low speed rotation of the engine, the pulser 5B detects a trailing edge in the rotational direction of the reluctor 17 to generate a second pulse more than a threshold having a polarity different from the first pulse.

Generally, the position where the pulser 5B generates the first pulse is set to a position advanced from a maximum advanced position of the ignition point of the engine (a rotational angle position of the crankshaft when the engine is ignited), and the second position is set to a position appropriate for an ignition point at a start of the engine (a position close to a crank angle position when a piston reaches top dead center). The pulses generated by the pulser 5B are used for obtaining rotational speed information or rotational angle information of the engine when ignition timing or fuel injection timing of the engine is controlled, and also used for detecting a reference phase of a below described AC control voltage when the AC control voltage is generated. In the embodiment, the internal combustion engine that drives the magneto generator 1 is a single-cylinder engine.

The AC/DC conversion circuit 3 is comprised of an AC/DC converter including a diode bridge full-wave rectifier circuit constituted by bridge connected diodes Du, Dv, Dw, Dx, Dy and Dz, an inverter including a bridge type switch circuit constituted by bride connected switch elements Qu, Qv, Qw, Qx, Qy and Qz formed of MOSFETs, and a capacitor Ca connected across a DC terminal of the inverter.

In the shown embodiment, the switch elements Qu, Qv, Qw, Qx, Qy and Qz that constitute the inverter are connected in anti-parallel to the diodes Du, Dv, Dw, Dx, Dy and Dz that constitute the rectifier circuit, AC external terminals 3u, 3v and 3w connecting to three-phase AC terminals of the converter and the inverter are connected to a three-phase output terminal 1u, 1V and 1w of the magneto generator 1, and positive and negative DC external terminals 3a and 3b connecting to DC terminals of the converter and the inverter are connected to a positive terminal and a negative terminal, respectively, of the battery 2.

The AC/DC converter including the diode bridge full-wave rectifier circuit constituted by the diodes Du, Dv, Dw, Dx, Dy and Dz rectifies a three-phase AC voltage induced in the armature coil Lu to Lw and supplies a charging current to the battery 2.

The inverter including the bridge circuit constituted by the switch elements Qu, Qv, Qw, Qx, Qy and Qz converts a voltage of the battery (voltage accumulation means) 2 into an AC voltage when an output of the magneto generator requires to be adjusted, and applies the AC voltage as the AC control voltage to the armature coil Lu to Lw.

The pulse signals generated by the pulser 5B of the signal generating device 5 are converted, by a waveform shaping circuit 18, into signals that can be recognized by the microprocessor, and input into the microprocessor in the controller 4.

In the embodiment, the charging current of the battery 2 (an output current of the magneto generator) is controlled and kept at a target value as an output of the magneto generator, and thus an output of a sensor (a current transformer) CTi that detects the charging current is input into the controller 4 via a current detection circuit 19.

In the invention, the output of the magneto generator to be controlled may be electricity obtained from the magneto generator, and is not limited to a current supplied to a load. For example, a current passing through an armature coil may be controlled and kept at a target value as the output of the magneto generator. In this case, a sensor CTw that detects a current passing through an at least one-phase (w-phase in the shown example) armature coil is provided to input an output of the sensor into the controller via the current detection circuit 19.

A voltage applied to the load may be controlled and kept at a target value as the output of the magneto generator. In this case, a voltage detection circuit 20 that detects a voltage across the battery 2 is provided to input the output of the voltage detection circuit into the controller 4.

The microprocessor of the controller 4 executes a program stored in a ROM to construct means for controlling an ignition device or a fuel injection device that are unshown, by using the rotational angle position information and the rotational speed information included in the pulses generated by the pulser 5B, and means for controlling the inverter of the AC/DC conversion circuit 3 so as to apply an AC control voltage having a phase angle required for keeping the output of the magneto generator at a target value to an armature coil, by using output information of the magneto generator obtained from the current detection circuit 19 or output information of the magneto generator obtained from the voltage detection circuit 20.

In the invention, when the output of the magneto generator deviates from the target value, the AC control voltage is supplied to the armature coil Lu to Lw of the magneto generator from the voltage accumulation means (the battery 2 in the embodiment) provided on the load side via the inverter of the AC/DC conversion circuit 3, and the phase angle of the AC control voltage is controlled depending on a deviation between the output of the magneto generator and the target value to drive control the output of the generator.

In conventional drive control, the phase angle of the AC control voltage is controlled and only changed to the delayed side when the output of the magneto generator is lower than the target value, and the phase angle of the AC control voltage is controlled and only changed to the advanced side when the output of the magneto generator is higher than the target value. However, by such simple control, the output of the generator sometimes cannot be controlled when the deviation between the output of the generator and the target value becomes large.

Figure 10:
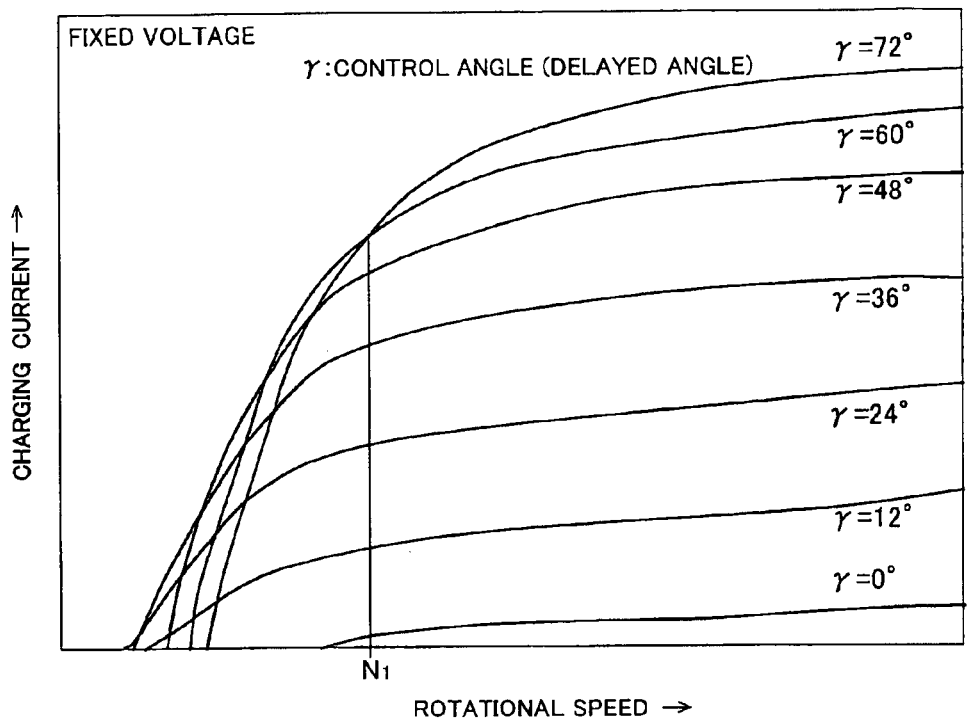
FIG. 10 is a graph of an example of a charging current to rotational speed characteristic when an AC control voltage is applied to a magneto generator from a battery in a generating device comprised so as to charge the battery with a rectified output of the magneto generator, with amounts of delay of a phase angle of the AC control voltage taken in parameters.

FIG. 10 is a graph of an example of a relationship between the charging current (the output of the generator) and a rotational speed of the generator in a generating device in which the battery is charged with a DC output obtained by rectifying the output of the magneto generator, with a control angle γ (a phase angle of the AC control voltage relative to a phase of a no-load induced voltage of the armature coil) taken in parameters. In this example, the AC control voltage is delayed relative to the no-load induced voltage of the armature coil. In the example in FIG. 10, in an area where the rotational speed is lower than N1, a relationship between a changing direction of the control angle γ and a changing direction of the charging current (the output of the generator) is reversed. As is apparent from FIG. 10, a changing range of the control angle, in which a relationship such that the output of the generator increases with the change of the control angle to the delayed side is met between the control angle and the output of the generator, becomes narrower for a lower rotational speed.

Figure 11:
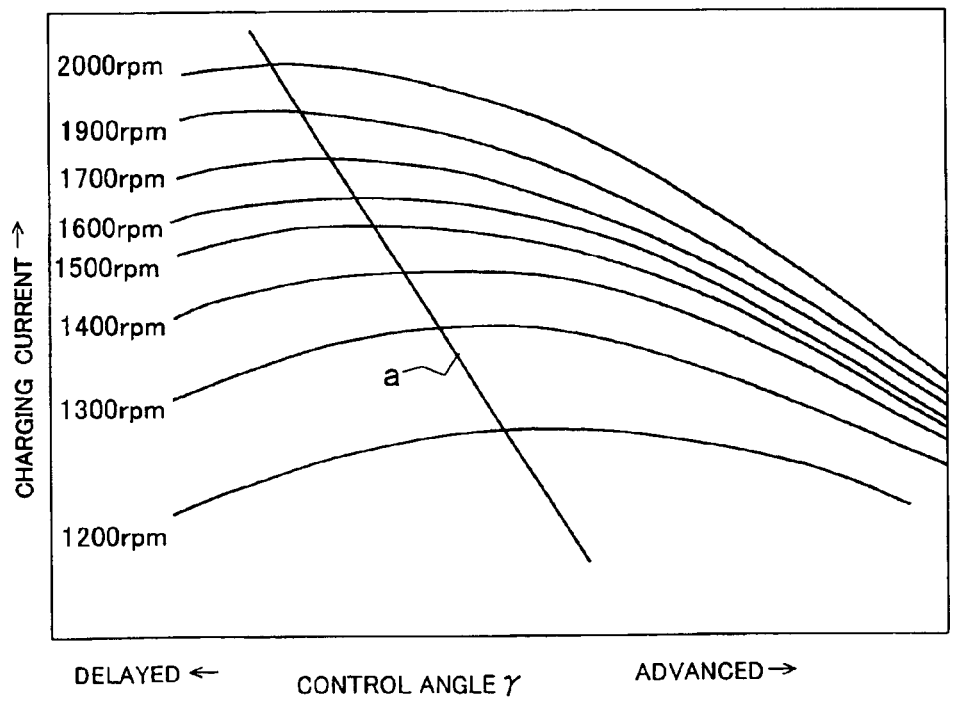
FIG. 11 is a graph of an example of a charging current to control angle characteristic when the AC control voltage is applied to the magneto generator from the battery in the generator comprised so as to charge the battery with the rectified output of the magneto generator, with rotational speeds of the magneto generator taken in parameters.

FIG. 11 is a graph of an example of a relationship between a charging current of the battery passing when the battery is charged with a rectified output of the magneto generator and the control angle, with a rotational speed taken in parameters. In FIG. 11, a denotes a boundary of two areas having opposite relationships between the changing direction of the control angle and the changing direction of the output of the generator, which is a line connecting points at which the charging current becomes maximum in each rotational speed.

In FIG. 11, in an area on the right of the boundary a, the output of the generator decreases when the control angle is changed to the advanced side, and the output of the generator increases when the control angle is changed to the delayed side. On the other hand, in an area on the left of the boundary a, the output of the generator increases when the control angle is changed to the advanced side, and the output of the generator decreases when the control angle is changed to the delayed side.

As described above, when the output of the magneto generator is controlled by the drive control, the relationship between the changing direction of the control angle and the changing direction of the output of the generator may be reversed during a process of changing the control angle to the delayed side to increase the output of the generator to the target value, and the output of the generator may decrease with the change of the control angle to the delayed side. In such a state, the output of the generator decreases with the change of the control angle to the delayed side, and thus if the phase angle of the AC control voltage is controlled and only changed to the delayed side when the output of the generator is lower than the target value, the control angle continues changing to the delayed side and cannot return to normal control.

Similarly, when the control angle is changed to the advanced side to restrain the output of the generator, the relationship between the changing direction of the control angle and the changing direction of the output of the generator is reversed, and thus if the control angle is excessively changed to the advanced side, the output of the generator increases, and the control angle continues changing to the advanced side and cannot return to the normal control.

Therefore, according to the invention, in the case where the output of the generator is adjusted by the drive control, as in the area on the right of the boundary a in FIG. 11, it is determined that a control characteristic, in which the output of the generator decreases when the control angle is changed to the advanced side (the phase angle of the AC control voltage is changed to the advanced side relative to a present phase angle), and the output of the generator increases when the control angle is changed to the delayed side (the phase angle of the AC control voltage is changed to the delayed side relative to the present phase angle), is a normal control characteristic, and as in the area on the left of the boundary a in FIG. 11, it is determined that a control characteristic, in which the output of the generator increases when the control angle is changed to the advanced, and the output of the generator decreases when the control angle is changed to the delayed side, is a reciprocal control characteristic, and it is determined whether the present control characteristic is the normal control characteristic or the reciprocal control characteristic, and depending on a magnitude relationship between the output of the generator and the target value, and the determined control characteristic, the phase angle of the AC control voltage is changed in a proper direction to control and keep the output of the generator at the target value.

Specifically, when the present control characteristic is determined as the normal control characteristic, and the output of the magneto generator is lower than the target value, the phase angle of the AC control voltage is changed to the delayed side relative to the present phase angle, and when the present control characteristic is determined as the normal control characteristic, and the output of the magneto generator is higher than the target value, the phase angle of the AC control voltage is changed to the advanced side relative to the present phase angle. When the control characteristic is determined as the reciprocal control characteristic, and the output of the magneto generator is lower than the target value, the phase angle of the AC control voltage is changed to the advance side relative to the present phase angle, and when the control characteristic is determined as the reciprocal control characteristic, and the output of the magneto generator is higher than the target value, the phase angle of the AC control voltage is changed to the delayed side relative to the present phase angle.

Such control prevents abnormal states in which the phase angle of the AC control voltage continues changing to the delayed side and cannot return to the normal control when the control characteristic changes from the normal control characteristic to the reciprocal control characteristic during a process of controlling and increasing the output of the magneto generator to the target value, or the phase angle of the AC control voltage continues changing to the advanced side and cannot return to the normal control when the control characteristic changes from the normal control characteristic to the reciprocal control characteristic during a process of controlling and reducing the output of the magneto generator to the target value, and always allows proper control of the output of the magneto generator by the control angle of the AC control voltage.

Figure 2:
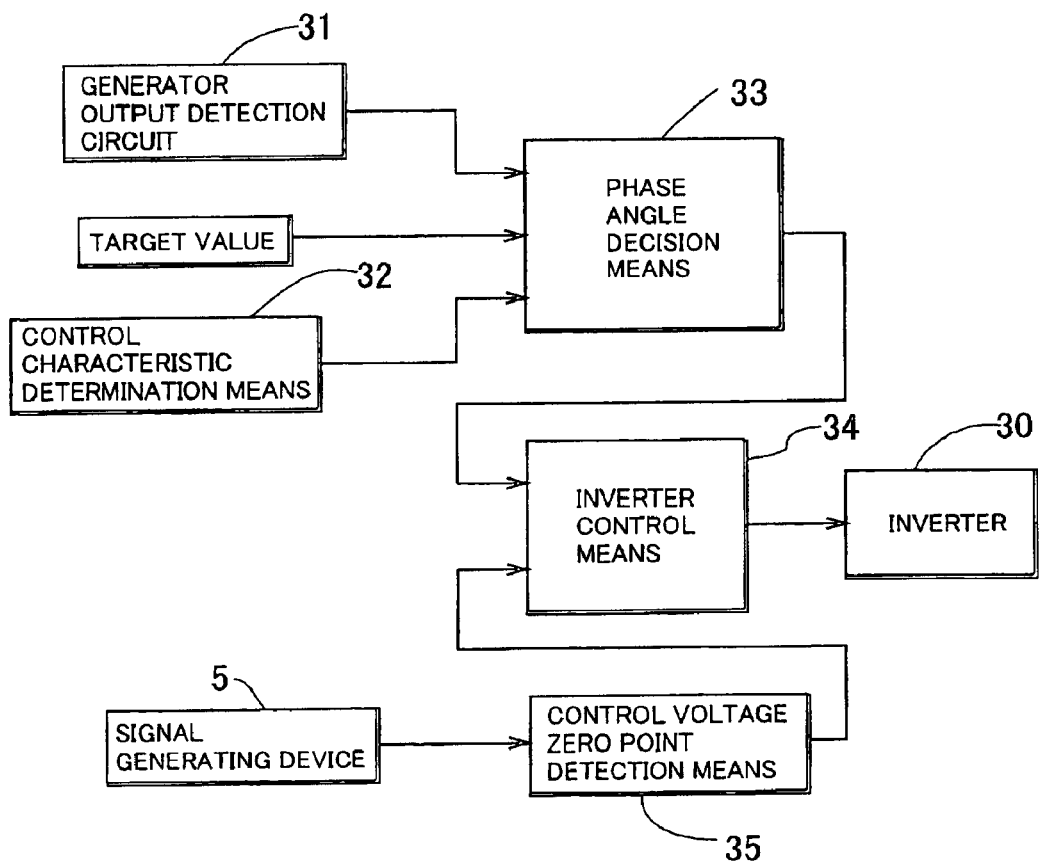
FIG. 2 is a schematic block diagram of a construction of a control unit of the generating device in FIG. 1.

FIG. 2 shows a construction of a control unit provided for controlling the inverter of the AC/DC conversion circuit 3 in the generating device in FIG. 1. In FIG. 2, 30 denotes the inverter including the bridge circuit constituted by the switch elements Qu, Qv, Qw, Qx, Qy and Qz; 31, a generator output detection circuit constituted by the current detection circuit 19 or the voltage detection circuit 20; 32, control characteristic determination means; 33, phase angle determination means; 34, inverter control means; 35, control voltage zero point detection means.

The control characteristic determination means 32 determines that the control characteristic, in which the output of the magneto generator increases when the phase angle of the AC control voltage is changed to the delayed side relative to the present phase angle, and the output of the magneto generator decreases when the phase angle of the AC control voltage is changed to the advanced side relative to the present phase angle, is the normal control characteristic, and the control characteristic, in which the output of the magneto generator decreases when the phase angle of the AC control voltage is changed to the delayed side relative to the present phase angle, and the output of the magneto generator increases when the phase angle of the AC control voltage is changed to the advanced side relative to the present phase angle, is the reciprocal control characteristic, and determines whether the present control characteristic relative to the phase angle of the AC control voltage of the output of the magneto generator is the normal control characteristic or the reciprocal control characteristic.

The phase angle decision means 33 changes the phase angle of the AC control voltage in a direction of bringing the output of the magneto generator close to the target value depending on a determination result of the control characteristic determination means 32 to decide a new phase angle of the AC control voltage, and the inverter control means 34 controls the inverter 30 so as to apply the AC control voltage having the phase angle decided by the phase angle decision means 33 to the armature coil Lu to Lw.

The control voltage zero point detection means 35 regards each zero point of the AC control voltage having the phase angle determined by the phase angle decision means 33 as a target zero point, and detects each target zero point with reference to a timing at which the signal generating device 5 generates a specific pulse.

The inverter control means 34 is comprised so as to control the inverter to apply an AC voltage having each zero point matching each target zero point detected by the control voltage zero point detection means to the armature coil from the voltage accumulation means (the capacitor Ca and the battery 2 in the embodiment).

Among the means in FIG. 2, the control characteristic determination means 32, the phase angle decision means 33, the inverter control means 34 and the control voltage zero point detection means 35 are constructed by predetermined programs executed by the microprocessor.

Figure 3:
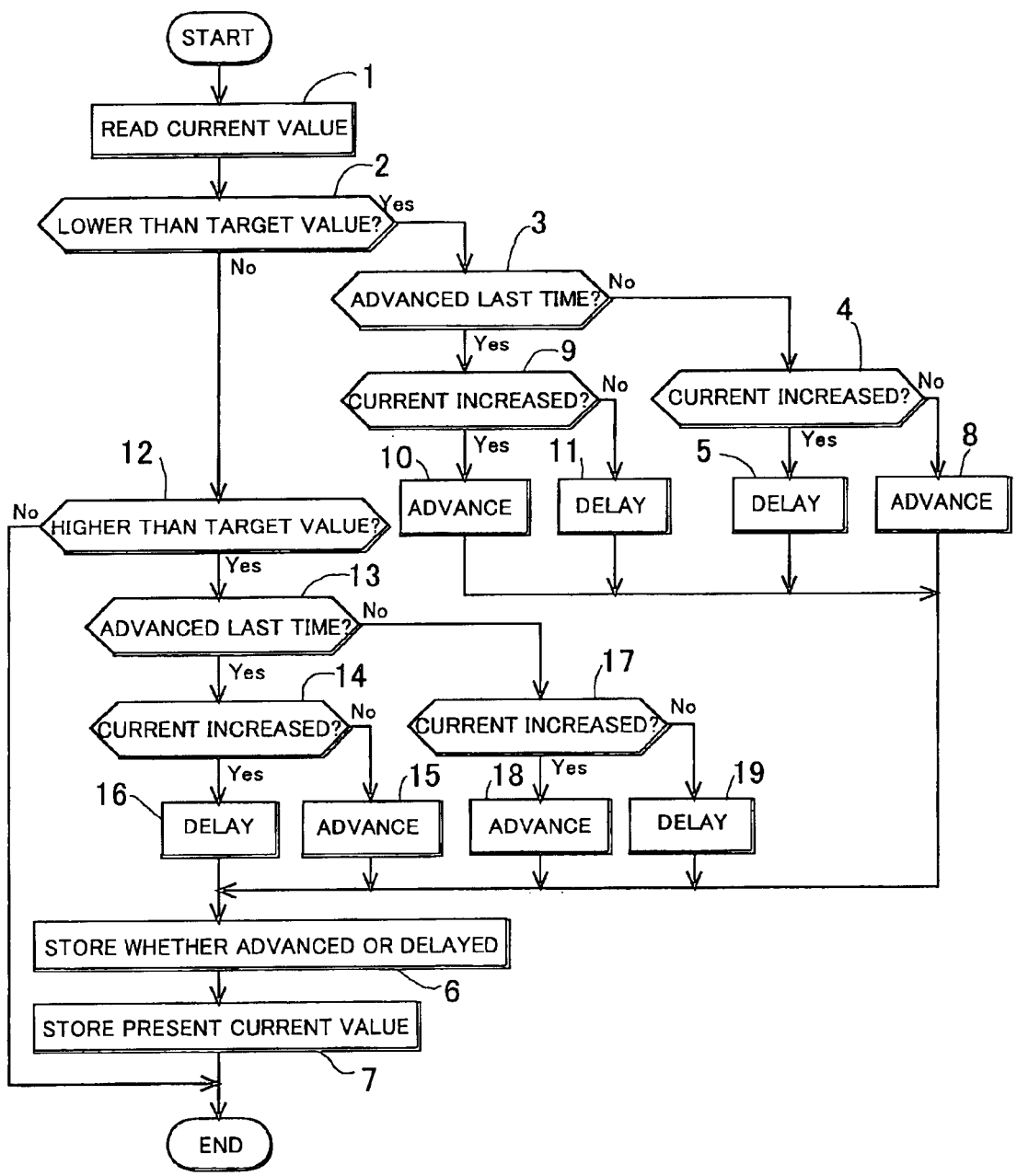
FIG. 3 is a flowchart of an example of an algorithm of a program executed by a microprocessor for constructing control characteristic determination means and phase angle decision means when an output current of a generator is controlled and kept at a target value in an embodiment of the invention.

In order to construct the control characteristic determination means 32 and the phase angle decision means 33, a flowchart of an algorithm of a program executed by the microprocessor of the controller 4 is shown in FIG. 3. A routine in FIG. 3 is executed every time the microprocessor samples the output of the current detection circuit 19.

According to the algorithm in FIG. 3, first, in Step 1, a charging current value detected by the current detection circuit 19 is read, and it is determined in Step 2 whether the read current value is lower than the target value. When it is determined that the current value is lower than the target value, the process proceeds to Step 3, and it is determined whether the phase angle of the AC control voltage is changed to the advanced side when the routine is last executed. When it is determined that the phase angle is not changed to the advanced side last time, the process proceeds to Step 4, and it is determined whether the current value read this time increases above the last value. When it is determined that the current value read this time increases above the last value, it is determined that the present control characteristic is the normal control characteristic, the process proceeds to Step 5, and the phase angle of the AC control voltage is changed to the delayed side through a predetermined amount as compared with the last value. Then, the process proceeds to Step 6, and this change of the phase angle of the AC control voltage to the delayed side is stored, and in Step 7, the present current value is stored to finish the routine.

When it is determined in Step 3 that the phase angle is not changed to the advanced side last time, and then it is determined in Step 4 that the current value read this time does not increase above the current value read last time (when it is determined that the current value decreases though the phase angle is not changed to the advanced side), it is determined that the present control characteristic is the reciprocal control characteristic, and in Step 8, the phase angle of the AC control voltage is changed to the advanced side through a fixed angle. Then, the process proceeds to Step 6, and this change of the phase angle of the AC control voltage to the advanced side is stored, and in Step 7, the present current value is stored to finish the routine.

When it is determined in Step 2 that the current value read this time is lower than the target value, and then it is determined in Step 3 that the phase angle is changed to the advanced side, the process proceeds to Step 9, and it is determined whether the current value read this time increases above the last value. When it is determined that the current value read this time increases above the last value, it is determined that the present control characteristic is still the reciprocal control characteristic, the process proceeds to Step 10, and the phase angle of the AC control voltage is changed to the advanced side. Then, the process proceeds to Step 6, and this change of the phase angle of the AC control voltage to the advanced side is stored, and in Step 7, the present current value is stored to finish the routine.

When it is determined in Step 9 that the current value read this time does not increase above the last value, it is determined that the present control characteristic is the normal control characteristic, the process proceeds to Step 11, and the phase angle of the AC control voltage is changed to the delayed side through a predetermined amount. Then, the process proceeds to Step 6, and this change of the phase angle of the AC control voltage to the delayed side is stored, and in Step 7, the present current value is stored to finish the routine.

When it is determined in Step 2 that the current value read this time is not lower than the target value, the process proceeds to Step 12, and it is determined whether the current value is higher than the target value. When it is determined that the current value read this time is not higher than the target value (equal to the target value), no further operation is performed to finish the routine.

When it is determined in Step 2 that the current value read this time is not lower than the target value, and then it is determined in Step 12 that the current value read this time is higher than the target value, it is determined in Step 13 whether the phase angle of the AC control voltage is changed to the advanced side when the routine is last executed. When it is determined that the phase angle is changed to the advanced side last time, it is determined in Step 14 whether the current value read this time increases above the current value read last time. When the current value read this time does not increase above the last value, it is determined that the present control characteristic is the normal control characteristic, and in Step 15, the phase angle of the AC control voltage is changed to the advanced side through a predetermined amount. Then, the process proceeds to Step 6, and this change of the phase angle of the AC control voltage to the advanced side is stored, and in Step 7, the present current value is stored to finish the routine.

When it is determined in Step 2 that the current value read this time is not lower than the target value, it is determined in Step 12 that the current value read this time is higher than the target value, it is determined in Step 13 that the phase angle of the AC control voltage is changed to the advanced side last time, and then it is determined in Step 14 whether the current value read this time increases above the last value, it is determined that the present control characteristic is the reciprocal control characteristic, and in Step 16, the phase angle of the AC control voltage is changed to the delayed side through a predetermined amount. Then, the process proceeds to Step 6, and this change of the phase angle of the AC control voltage to the delayed side is stored, and in Step 7, the present current value is stored to finish the routine.

When it is determined in Step 2 that the current value read this time is not lower than the target value, it is determined in Step 12 that the current value read this time is higher than the target value, and it is determined in Step 13 that the phase angle of the AC control voltage is not changed to the advanced side last time, the process proceeds to Step 17, and it is determined whether the current value read this time increases above the current value read last time. When it is determined that the current value read this time increases above the current value read last time, it is determined that the present control characteristic is the normal control characteristic, the process proceeds to Step 18, and the phase angle of the AC control voltage is changed to the advanced side through a predetermined amount. Then, the process proceeds to Step 6, and this change of the phase angle of the AC control voltage to the advanced side is stored, and in Step 7, the present current value is stored to finish the routine.

When it is determined in Step 2 that the current value read this time is not lower than the target value, it is determined in Step 12 that the current value read this time is higher than the target value, it is determined in Step 13 that the phase angle of the AC control voltage is not changed to the advanced side last time, and it is determined in Step 17 that the current value read this time does not increase above the current value read last time, it is determined that the present control characteristic is the reciprocal control characteristic, the process proceeds to Step 19, and the phase angle of the AC control voltage is changed to the delayed side through a predetermined amount. Then, the process proceeds to Step 6, and this change of the phase angle of the AC control voltage to the advanced side is stored, and in Step 7, the present current value is stored to finish the routine.

For realizing control voltage phase angle control means according to the routine in FIG. 2, the control characteristic determination means is constructed by Steps 2, 3, 4, 9, 12, 13, 14 and 17, which determines that the control characteristic, in which the output of the magneto generator increases/decreases when the phase angle of the AC control voltage is changed to the delayed/advanced side relative to the present phase angle, is the normal control characteristic, and the control characteristic, in which the output of the magneto generator decreases/increases when the phase angle of the AC control voltage is changed to the delayed/advanced side relative to the present phase angle, is the reciprocal control characteristic, and determines whether the present control characteristic is the normal control characteristic or the reciprocal control characteristic.

The phase angle decision means is constructed by Steps 5, 8, 10, 11, 15, 16, 18 and 19, which changes the phase angle of the AC control voltage in the direction of bringing the output of the magneto generator close to the target value depending on the determination result of the control characteristic determination means to decide a new phase angle of the AC control voltage.

Among the means shown in FIG. 2, the control voltage zero point detection means 35 is comprised so as to measure a time corresponding to a predetermined phase angle by a timer with reference to a timing at which the signal generating device 5 generates a specific pulse as measurement start timing, to detect each zero point of the AC control voltage.

As an example, a zero point when the no-load induced voltage of the armature coil moves from a negative half wave to a positive half wave is regarded as a reference phase of the AC control voltage, and the mounting position of the pulser 5B is set such that the pulser 5B detects the leading edge in the rotational direction of the reluctor 17 to generate the first pulse at a position advanced through a relative to the reference phase.

In this case, the timing at which the signal generating device 5 generates the first pulse can be detected as a specific zero point of an AC control voltage having a phase angle advanced through $\alpha$ relative to the reference phase, and timing delayed through $\pi/2$ from the specific zero point can be measured by the timer to detect other zero points of the AC control voltage.

When the signal generating device 5 generates the first pulse, measurement of a time corresponding to the advanced angle $\alpha$ by the timer is started to detect timing at which the timer finishes the measurement of the time, and thus a specific zero point of an AC control voltage with a zero control angle (the no-load induced voltage of the armature coil) can be detected, and the timing delayed through $\pi/2$ from the specific zero point can be measured by the timer to detect other zero points of the AC control voltage.

Further, when the signal generating device 5 generates the first pulse, measurement of a time corresponding to an angle $\alpha+\gamma$ by the timer is started to detect timing at which the timer finishes the measurement of the time, and thus a specific zero point of an AC control voltage with a phase delayed through an angle $\gamma$ as compared with the no-load induced voltage of the armature coil (with a control angle being $\gamma$) can be detected, and the timing delayed through $\pi/2$ from the specific zero point is measured by the timer to detect other zero points of the AC control voltage.

The inverter control means 34 changes combinations of the switch elements of the inverter that are turned on at each zero point of the AC control voltage of each phase detected by the control voltage zero point detection means, turns on/off the switch elements in a turn-on time in a predetermined duty ratio so as to generate an AC control voltage having a predetermined waveform from the inverter, and thus generates the AC control voltage having the phase angle decided by the phase angle decision means from the inverter. The technique for controlling an inverter so as to convert a DC voltage into an AC voltage having a predetermined waveform and a phase angle is already known, and detailed descriptions thereof will be omitted.

Figure 4:
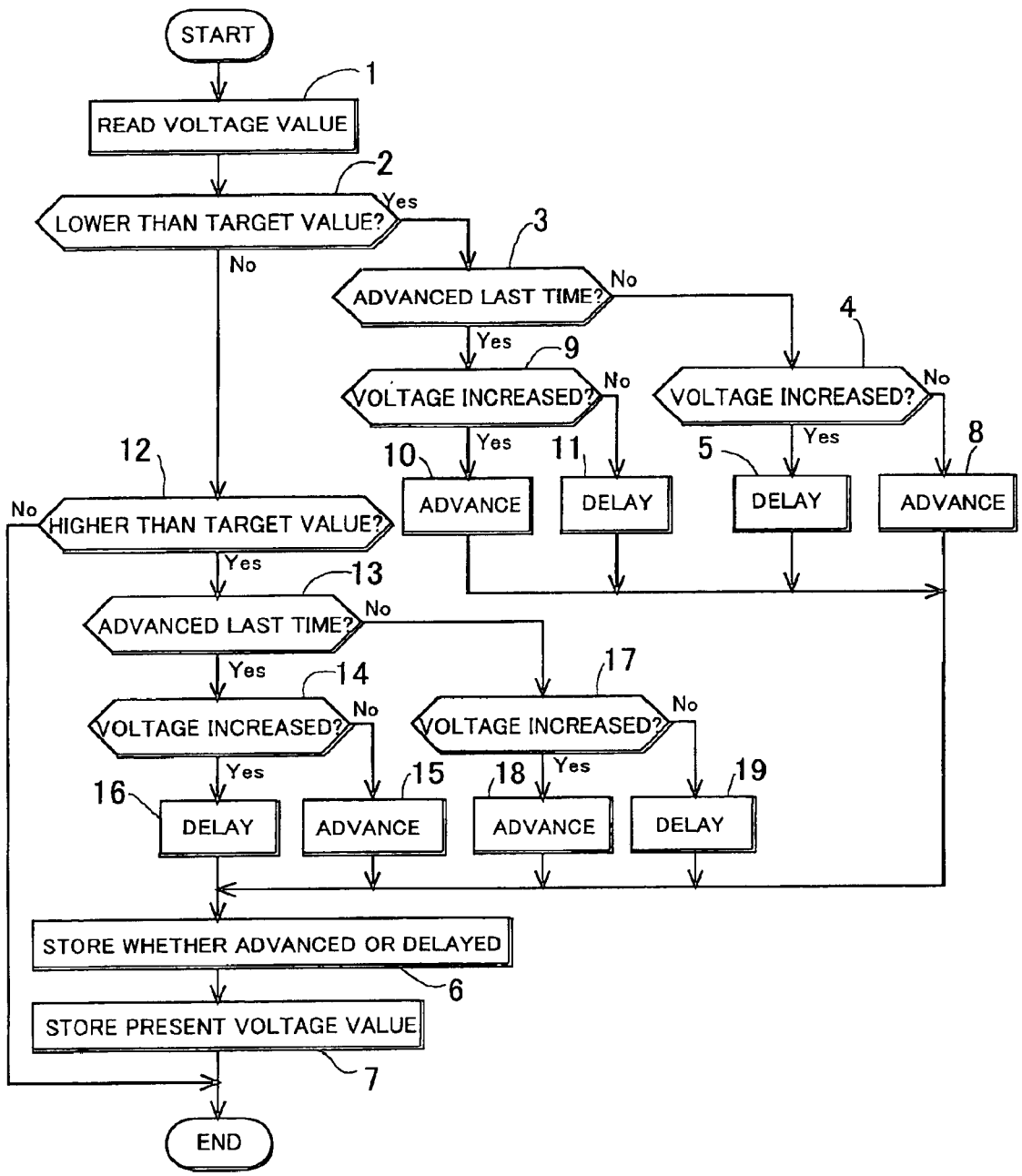
FIG. 4 is a flowchart of another example of an algorithm of a program executed by a microprocessor for constructing control characteristic determination means and phase angle decision means when an output voltage of a generator is controlled and kept at a target value in another embodiment of the invention.

In the embodiment, the charging current is controlled and kept at the target value as the output of the magneto generator, but when the voltage across the battery detected by the voltage detection circuit 20 is controlled and kept at the target value as the output of the magneto generator, the program of the above described algorithm is executed to realize control voltage phase angle control means. A flowchart is shown in FIG. 4 of an algorithm of a routine executed every time the microprocessor samples the output of the voltage detection circuit 20 when the voltage across the battery is controlled and kept at the target value as the output of the magneto generator. The flowchart in FIG. 4 is the flowchart in FIG. 3 with the current replaced by the voltage, and a series of processings performed in the routine in FIG. 4 is the same as the processings in the routine in FIG. 3 except that the voltage is to be controlled instead of the current, and descriptions thereof will be omitted.

In the example in FIGS. 3 and 4, the control characteristic determination means and the phase angle decision means are constructed according to the same routine, but may be constructed according to different routines.

Figure 5:
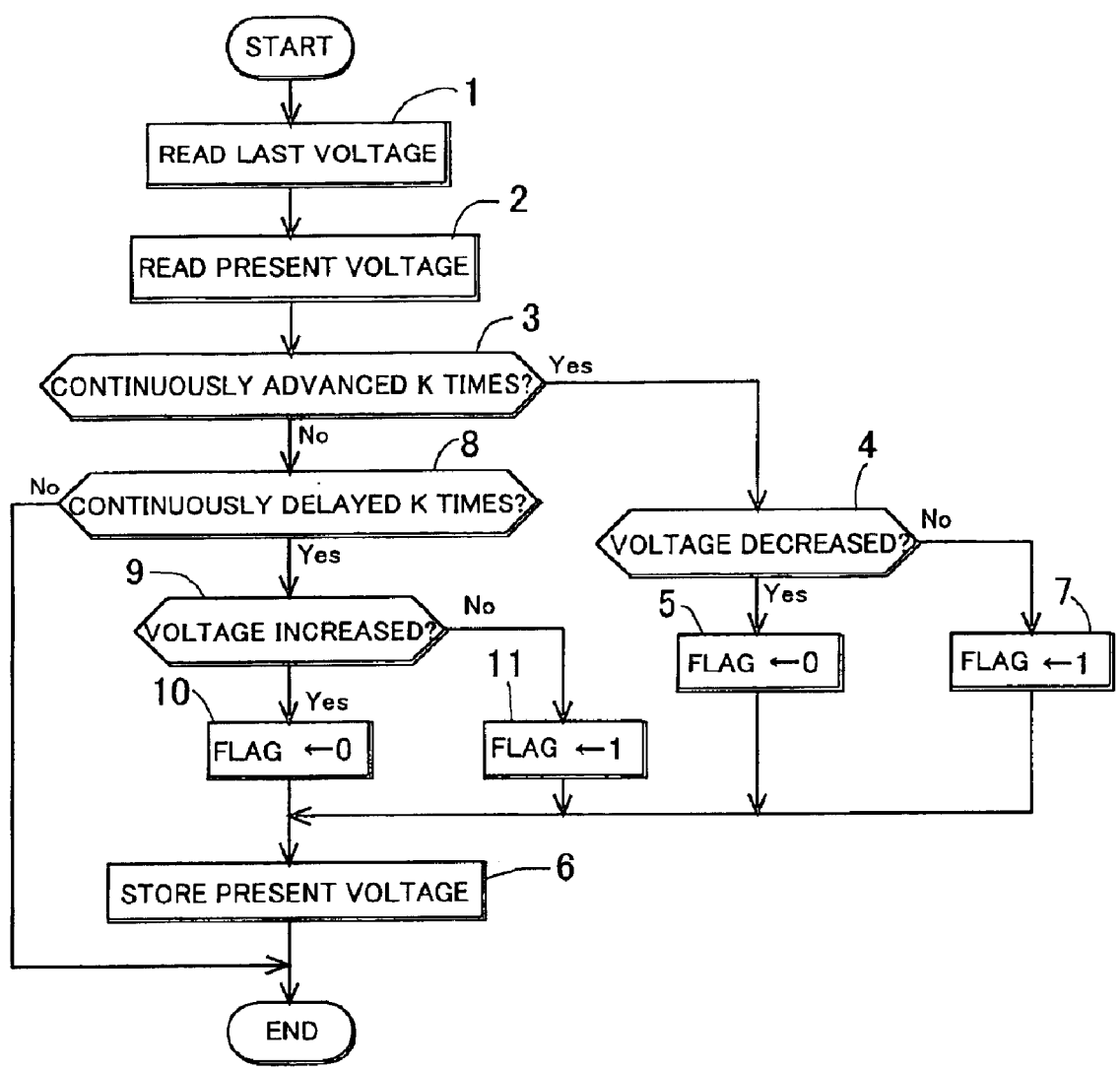
FIG. 5 is a flowchart of an algorithm of a program executed by a microprocessor for constructing control characteristic determination means in a further embodiment of the invention.
Figure 6:
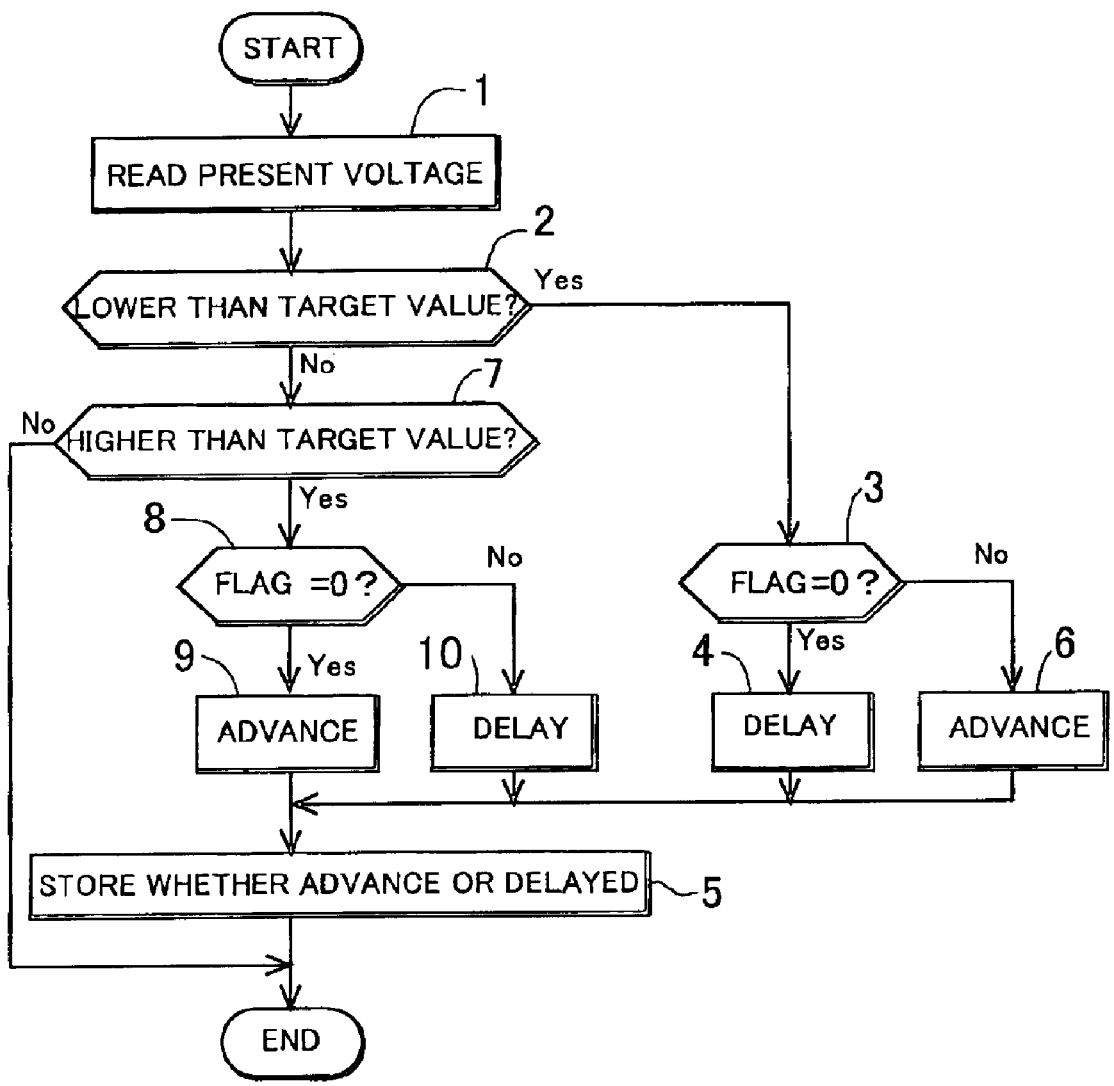
FIG. 6 is a flowchart of an algorithm of a program executed by the microprocessor for constructing phase angle decision means in the embodiment in FIG. 5.

When the control characteristic determination means and the phase angle decision means are constructed according to different routines, a flowchart of an algorithm of a routine for realizing the control characteristic determination means is shown in FIG. 5, and a flowchart of an algorithm of a routine for realizing the phase angle decision means is shown in FIG. 6. In this embodiment, the voltage across the battery is controlled and kept at the target value as the output of the magneto generator.

The routine in FIG. 5 is executed every time the microprocessor samples the output of the voltage detection circuit 20, and the routine in FIG. 6 is successively executed after the routine in FIG. 5 is finished.

In the routine in FIG. 5, in Step 1, a voltage value stored when the routine is last executed is read, and then in Step 2, a present voltage value is read. Then, it is determined in Step 3 whether an operation of changing the phase angle of the AC control voltage to the advanced side is continuously performed a set number of times (k times). When it is determined that the operation of changing the phase angle of the AC control voltage to the advanced side is continuously performed the set number of times, it is determined in Step 4 whether the voltage value read this time decreases below the voltage value stored last time. When it is determined that the voltage value decreases, it is determined that the present control characteristic is the normal control characteristic, and in Step 5, a flag for the control characteristic determination is set to zero, and then in Step 6, the present voltage value is stored to finish the routine.

When it is determined in Step 4 that the voltage value does not decrease, it is determined that the present control characteristic is the reciprocal control characteristic, and the process proceeds to Step 7 to set the flag to one, and then Step 6 is performed.

When it is determined in Step 3 that the operation of changing the phase angle of the AC control voltage to the advanced side is not continuously performed the set number of times, it is determined in Step 8 whether an operation of changing the phase angle of the AC control voltage to the delayed side is continuously performed a set number of times. When it is determined that the operation of changing the phase angle of the AC control voltage to the delayed side is not continuously performed the set number of times, no further operation is performed to finish the routine.

When it is determined in Step 8 that the operation of changing the phase angle of the AC control voltage to the delayed side is continuously performed the set number of times, the process proceeds to Step 9, and it is determined whether the voltage value read this time increases above the voltage value stored last time. When it is determined that the voltage value increases, it is determined that the present control characteristic is the normal control characteristic, and the process proceeds to Step 10 to set the flag to zero, and in Step 6, the present voltage value is stored to finish the routine. When it is determined in Step 9 that the voltage value read this time does not increase above the voltage value stored last time, it is determined that the present control characteristic is the reciprocal control characteristic, the process proceeds to Step 11 to set the flag to one, and in Step 6, the present voltage value is stored to finish the routine.

In the routine in FIG. 6, in Step 1, the present voltage value is read, and it is determined in Step 2 whether the voltage value read this time is lower than the target value. When it is determined that the read voltage value is lower than the target value, the process proceeds to Step 3 to determine whether the flag is zero, and when the flag is zero (when the present control characteristic is the normal control characteristic), the process proceeds to Step 4 to change the phase angle of the AC control voltage to the delayed side through a predetermined fixed angle. Then, in Step 5, the change of the phase angle of the AC control voltage to the delayed side is stored, a count of count means that counts the number of operations of changing the phase angle to the delayed side is incremented by one, and a count of count means that counts the number of operations of changing the phase angle to the advanced side is cleared. After Step 5, the routine is finished.

When it is determined in Step 3 that the flag is one (when it is determined that the present control characteristic is the reciprocal control characteristic), in Step 6, the phase angle of the AC control voltage is changed to the advanced side through a predetermined fixed angle. Then, in Step 5, the change of the phase angle of the AC control voltage to the advanced side is stored, a count of the count means that counts the number of operations of changing the phase angle to the advanced side is incremented by one, and a count of the count means that counts the number of operations of changing the phase angle to the delayed side is cleared.

When it is determined in Step 2 whether the voltage value read this time is lower than the target value, and it is determined that the voltage value is not lower than the target value, the process proceeds to Step 7 to determine whether the voltage value is higher than the target value. When it is determined that the voltage value is not higher than the target value (equal to the target value), no further operation is performed to finish the routine. When it is determined in Step 7 that the voltage value is higher than the target value, the process proceeds to Step 8 to determine whether the flag is zero, and when the flag is zero (when the present control characteristic is the normal control characteristic), in Step 9, the phase angle of the AC control voltage is changed to the advanced side through a predetermined angle. Then, in Step 5, the change of the phase angle of the AC control voltage to the advanced side is stored, a count of the count means that counts the number of operations of changing the phase angle to the advanced side is incremented by one, and a count of the count means that counts the number of operations of changing the phase angle to the delayed side is cleared.

When it is determined in Step 8 that the flag is not zero (when the present control characteristic is the reciprocal control characteristic), the process proceeds to Step 10 to change the phase angle of the AC control voltage to the delayed side through a predetermined fixed angle. Then, in Step 5, the change of the phase angle of the AC control voltage to the delayed side is stored, a count of the count means that counts the number of operations of changing the phase angle to the delayed side is incremented by one, and a count of the count means that counts the number of operations of changing the phase angle to the advanced side is cleared.

In such a construction, only when the operation of changing the phase angle of the AC control voltage to the advanced side, or the operation of changing the phase angle to the delayed side is continuously performed the set number times k, the magnitude relationship between the output of the magneto generator and the target value is determined to change the phase angle of the AC control voltage depending on the determination result.

In the case where the magnitude relationship between the output of the magneto generator and the target value is determined every time to change the phase angle of the AC control voltage depending on the determination result, it may be determined by mistake that the control characteristic is still the normal control characteristic through the control characteristic becomes the reciprocal control characteristic when it takes long between when the phase angle of the AC control voltage is changed and when the output of the magneto generator is actually changed.

On the other hand, as in the embodiment shown in FIGS. 5 and 6, in the case where only when the operation of changing the phase angle of the AC control voltage to the advanced side, or the operation of changing the phase angle to the delayed side is continuously performed the set number times k, the magnitude relationship between the output of the magneto generator and the target value is determined to change the phase angle of the AC control voltage depending on the determination result, a frequency of determining the magnitude relationship between the output of the magneto generator and the target value can be appropriately set to properly determine whether the control characteristic is changed from the normal control characteristic to the reciprocal control characteristic when it takes long between when the phase angle of the AC control voltage is changed and when the output of the magneto generator is actually changed.

In the embodiments, whether the control characteristic is the normal control characteristic or the reciprocal control characteristic is determined from the changing direction of the control angle and the changing direction of the output of the magneto generator. However, the characteristic of the magneto generator may be previously checked to prepare data for providing a relationship between the rotational speed and the control characteristic of the magneto generator, and based on the data, the control angle may be controlled so as to prevent the control characteristic from becoming the reciprocal control characteristic.

Figure 7:
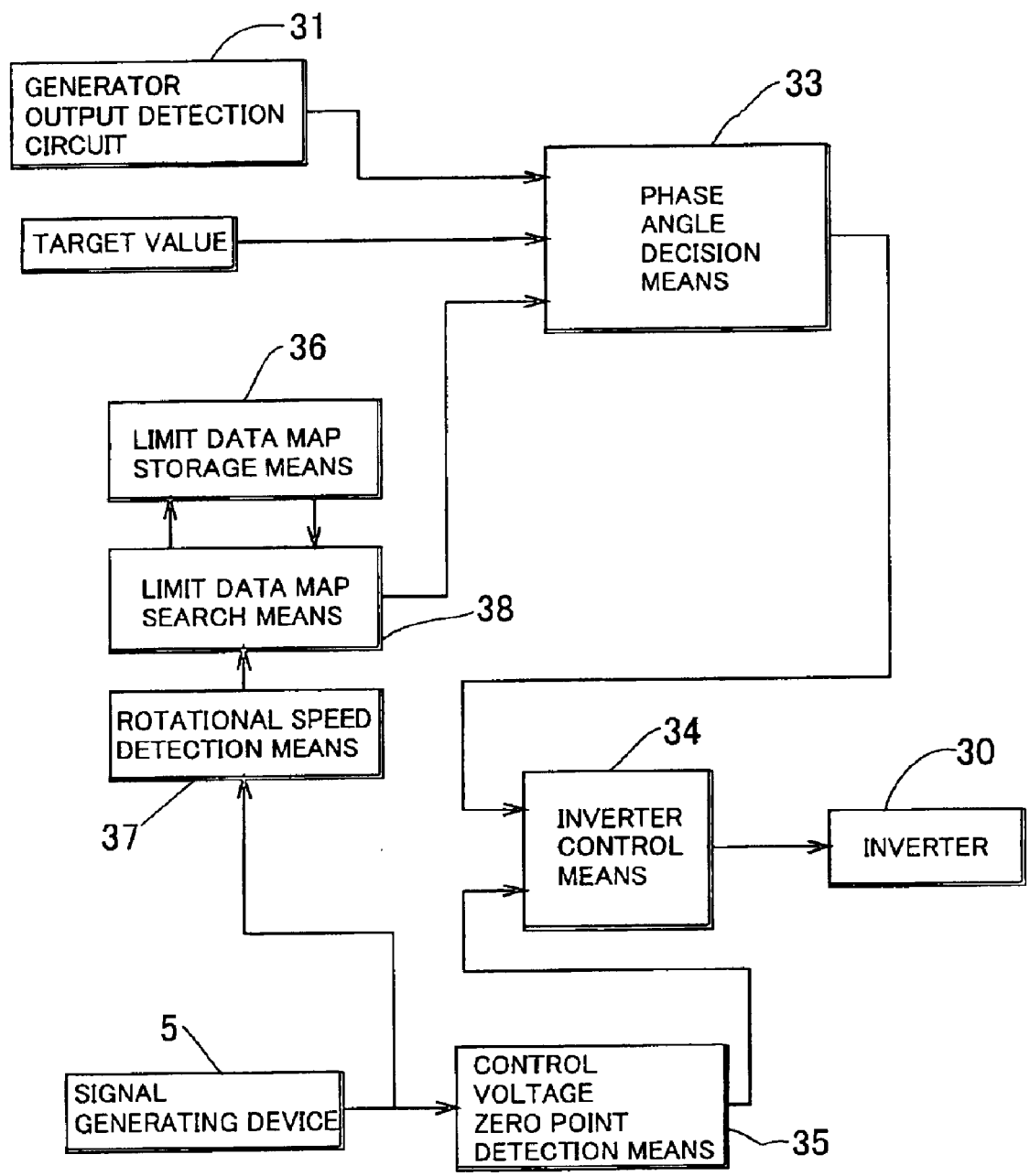
FIG. 7 is a schematic block diagram of a construction of a control unit of a generating device according to a further embodiment of the invention.

In such a construction, as shown in FIG. 7, the controller 4 includes: phase angle decision means 33 that changes the phase angle of the AC control voltage to a delayed side when the output of the magneto generator 1 is lower than the target value, and changes the phase angle of the AC control voltage to an advanced side when the output of the magneto generator 1 is higher than the target value, to decide a new phase angle of the AC control voltage; inverter control means 34 that controls the inverter 30 so as to apply the AC control voltage having the phase angle decided by the phase angle decision means 33 to the armature coil; limit data map storage means 36 that stores a limit data map providing a relationship between an advanced side limit value and a delayed side limit value within a normal phase angle changing range and a rotational speed of the magnet rotor, the normal phase angle changing range being a changing range of the phase angle of the AC control voltage in which a relationship, such that when the phase angle of the AC control voltage is changed to the delayed side relative to the present phase angle, the output of the magneto generator increases, and when the phase angle of the AC control voltage is changed to the advanced side relative to the present phase angle, the output of the magneto generator decreases, is met between a changing direction of the phase angle of the AC control voltage and a changing direction of the output of the magneto generator; rotational speed detection means 37 that detects a rotational speed of the magneto generator; and limit data map search means 38 that obtains an advanced side limit value and a delayed side limit value of a phase angle at a rotational speed detected by searching the limit data map for the rotational speed detected by the rotational speed detection means. In this case, the phase angle decision means 33 is comprised so as to decide a new phase angle of the AC control voltage only when the phase angle of the AC control voltage is between the advanced side limit value and the delayed side limit value.

The rotational speed detection means 37 is comprised so as to detect the rotational speed of the generator from, for example, an interval between specific pulses generated by the signal generating device 5 (a time required for one rotation of the magnet rotor).

Figure 8:
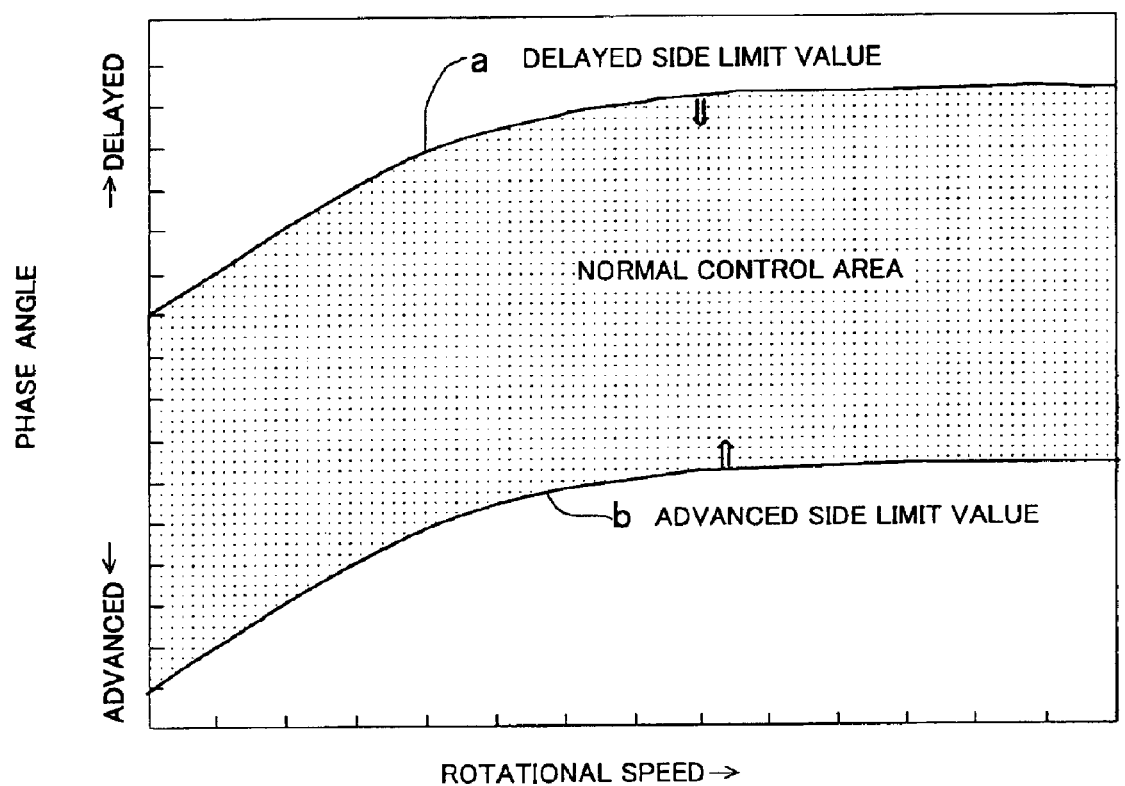
FIG. 8 is a graph illustrating a structure of a limit data map used in the embodiment in FIG. 7.

In such a construction, a limit data map that provides a relationship between the phase angle and the rotational speed, for example, as shown in FIG. 8, is stored in the limit data map storage means 36. In FIG. 8, a denotes a curve that provides a limit value on the delayed side of the AC control voltage and b denotes a curve that provides a limit value on the advanced side thereof, and an area between the curves a and b is an area where the normal control characteristic can be obtained.

Figure 9:
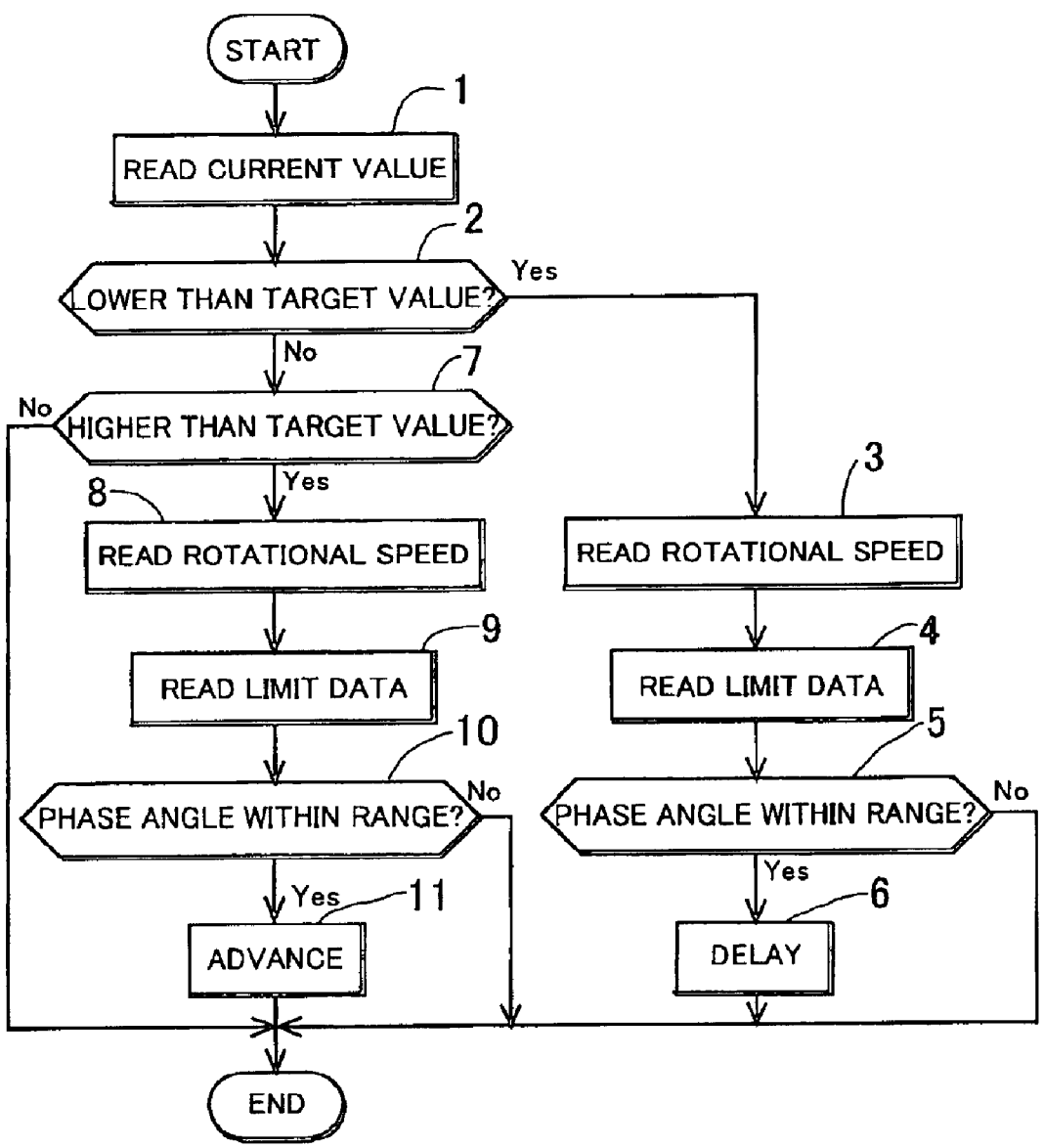
FIG. 9 is a flowchart of an example of an algorithm of a program executed by a microprocessor for constructing limit data map search means and phase angle decision means when the limit data map having the structure in FIG. 8 is used.

In this case, a routine in FIG. 9 is executed by the microprocessor of the controller 4 every time the microprocessor samples the output of the magneto generator to construct the phase angle decision means. In the routine in FIG. 9, it is assumed that the charging current of the battery is controlled as the output of the magneto generator.

When the routine in FIG. 9 is started, first, in Step 1, a current value of the charging current detected by the current detection circuit 19 is read. Then, it is determined in Step 2 whether the current value read this time is lower than the target value, and when the current value is lower than the target value, the process proceeds to Step 3 to read rotational speed information of the magneto generator obtained in a different routine and stored in a RAM.

The rotational speed of the magneto generator can be obtained by an arithmetical operation from a time obtained by measuring, by the timer, an interval between the first pulses generated by the pulser 5B (a time required for one rotation of the magnet rotor of the magneto generator). The time required for one rotation of the magnet rotor itself can be used as an amount including the rotational speed information. The process of calculating the rotational speed of the magneto generator is performed according to the routine executed every time the pulser 5B generates the first pulse, and data including the obtained rotational speed information is stored in the RAM.

After the rotational speed information is read in Step 3, the limit data map is searched for the read rotational speed in Step 4, and search results (the advanced side limit value and the delayed side limit value) are read. Then, it is determined in Step 5 whether the phase angle of the AC control voltage is between the advanced side limit value and the delayed side limit value, and when the phase angle of the AC control voltage is therebetween, the process proceeds to Step 6 to change the phase angle of the AC control voltage to the delayed side through a predetermined amount and finish the routine. When it is determined in Step 5 that the phase angle of the AC control voltage is not between the advanced side limit value and the delayed side limit value, the phase angle of the AC control voltage is not changed to finish the routine.

When it is determined in Step 2 that the current value read this time is not lower than the target value, the process proceeds to Step 7 to determine whether the read current value is higher than the target value. When it is determined that the current value is not higher than the target value (equal to the target value), the phase angle of the AC control voltage is not changed to finish the routine.

When it is determined in Step 7 that the current value is higher than the target value, the process proceeds to Step 8 to read the rotational speed information of the magneto generator, and in Step 9, the limit data map is searched for the read rotational speed to read the search results. Then, it is determined in Step 10 whether the phase angle of the AC control voltage is between the advanced side limit value and the delayed side limit value, and when it is determined that the phase angle of the AC control voltage is therebetween, the process proceeds to Step 11 to change the phase angle of the AC control voltage to the advanced side. When it is determined in Step 10 that the phase angle of the AC control voltage is not between the advanced side limit value and the delayed side limit value, the phase angle of the AC control voltage is not changed to finish the routine.

According to the algorithm in FIG. 9, the limit data map search means is constructed by Steps 3, 4, 8 and 9, and the phase angle decision means 33 is constructed by Steps 5, 6, 10 and 11.

In the embodiments, when the phase angle of the AC control voltage is changed, the phase angle is changed to the delayed side or the advanced side through the predetermined fixed angle. However, when the deviation between the output of the magneto generator and the target value is large, the phase angle of the AC control voltage may be significantly changed so that the amount of change of the phase angle of the AC control voltage decreases as the output of the AC control voltage comes closer to the target value.

Such a construction allows the output of the magneto generator to be rapidly set to the target value, and also prevents hunting caused by excessive control when the output of the AC control voltage comes close to the target value.

In the embodiments, the battery 2 is used as the voltage accumulation means to apply the AC control voltage to the armature coil from the battery via the inverter of the AC/DC conversion circuit 3, but a capacitor may be used as the voltage accumulation means instead of the battery 2.

As the above described embodiments, the signal generating device 5 of a flux change detection type, which has means for changing a magnetic flux when the rotational angle position of the magnet rotor matches the predetermined rotational angle position (the reluctor 17 in the above described embodiment), and a coil that detects the change of the magnetic flux to generate pulses, is used as a signal generating device used for detecting each zero point of the AC control voltage, thus the signal generating device can be comprised without a semiconductor sensor susceptible to heat, and when the magneto generator is driven by the internal combustion engine, the signal generating device 5 can be housed in a cover of the engine together with the magneto generator.

However, the present invention is not limited to the case of using the signal generating device to detect each zero point of the AC control voltage, but a position sensor (for example, a hall IC) that detects a polarity of a magnetic pole of the magnet rotor on the stator side of the magneto generator and outputs detection signals having different levels between when the detected polarity of the magnetic pole is a north pole and when it is a south pole may be provided to measure each zero point of the AC control voltage with reference to a rise or a fall of a signal obtained from the position sensor. An encoder that outputs a position detection signal in a predetermined rotational angle position of the magnet rotor is mounted to the magneto generator to detect each zero point of the AC control voltage by using rotational angle information of the magnet rotor obtained from the output of the encoder.

In the embodiment, the magnet rotor of the magneto generator has the magnetic field with two poles, and the stator has the three-phase armature coil, but the present invention can be generally applied to the case where a magneto generator comprised of a magnet rotor having a magnetic field with $2n$ poles (n is an integer equal to or more than 1), and a stator having an m-phase armature coil (m is an integer equal to or more than 2) is used.

Although some preferred embodiments of the invention have been described and illustrated with reference to the accompanying drawings, it will be understood by those skilled in the art that they are by way of example, and that various changes and modifications may be made without departing from the spirit and scope of the invention, which is defined only to the appended claims.

What is claimed is:

1. A generating device comprising:
   a magneto generator having a magnet rotor, and a stator having an m-phase armature coil (m is an integer equal to or more than 1) wound around an armature core with a magnetic pole portion facing a magnetic pole of said magnet rotor;
   an AC/DC conversion circuit having an AC/DC converter that converts an m-phase AC output voltage obtained from said magneto generator into a DC voltage to apply the DC voltage to voltage accumulation means, and an inverter that converts a voltage across said voltage accumulation means into an m-phase AC voltage to apply the AC voltage to said armature coil; and
   a controller that controls said inverter so as to apply an AC control voltage having the same frequency as an induced voltage of said armature coil to said armature coil from said voltage accumulation means via said inverter, and change a phase angle of said AC control voltage to control and bring an output of said magneto generator close to a target value, wherein said controller comprises:

control characteristic determination means that determines that a control characteristic, in which the output of said magneto generator increases when the phase angle of said AC control voltage is changed to a delayed side relative to a present phase angle, and the output of said magneto generator decreases when the phase angle of said AC control voltage is changed to an advanced side relative to the present phase angle, is the normal control characteristic, and a control characteristic, in which the output of said magneto generator decreases when the phase angle of said AC control voltage is changed to the delayed side relative to the present phase angle, and the output of said magneto generator increases when the phase angle of said AC control voltage is changed to the advanced side relative to the present phase angle, is the reciprocal control characteristic, and determines whether the present control characteristic relative to the phase angle of said AC control voltage of the output of said magneto generator is said normal control characteristic or said reciprocal control characteristic;

phase angle decision means that changes the phase angle of said AC control voltage in a direction of bringing the output of said magneto generator close to the target value depending on a determination result of said control characteristic determination means to decide a new phase angle of said AC control voltage; and inverter control means that controls said inverter so as to apply said AC control voltage having the phase angle decided by said phase angle decision means to said armature coil.

2. The generating device according to claim 1, wherein said generating device further comprises a signal generating device of a magnetic flux change detection type having means for changing a magnetic flux when a rotational angle position of said magnet rotor matches a predetermined rotational angle position, and a coil that detects the change of said magnetic flux to generate pulses, said controller further comprises control voltage zero point detection means that regards each zero point of said AC control voltage having the phase angle decided by said phase angle decision means as a target zero point, and detects each target zero point with reference to a timing at which said signal generating device generates a specific pulse, and said inverter control means is comprised so as to control said inverter to apply an AC voltage having each zero point matching each target zero point detected by said control voltage zero point detection means to said armature coil from said voltage accumulation means.

3. The generating device according to claim 1, wherein said phase angle decision means is comprised so as: to change the phase angle of said AC control voltage to the delayed side relative to the present phase angle to decide a new phase angle of said AC control voltage, when said control characteristic determination means determines that the present control characteristic is said normal control characteristic, and the output of said magneto generator is lower than the target value; to change the phase angle of said AC control voltage to the advanced side relative to the present phase angle to decide a new phase angle of said AC control voltage, when said control characteristic determination means determines that the present control characteristic is said normal control characteristic, and the output of said magneto generator is higher than the target value; to change the phase angle of said AC control voltage to the advanced side relative to the present phase angle to decide a new phase angle of said AC control voltage, when said control characteristic determination means determines that said control characteristic is the reciprocal control characteristic, and the output of said magneto generator is lower than the target value; and to change the phase angle of said AC control voltage to the delayed side relative to the present phase angle to decide a new phase angle of said AC control voltage, when said control characteristic determination means determines that said control characteristic is the reciprocal control characteristic, and the output of said magneto generator is higher than the target value.

4. A generating device including a magneto generator comprising:

a magneto generator having a magnet rotor, and a stator having an m-phase armature coil (m is an integer equal to or more than 1) wound around an armature core with a magnetic pole portion facing a magnetic pole of said magnet rotor;

an AC/DC conversion circuit having an AC/DC converter that converts an m-phase AC output voltage obtained from said magneto generator into a DC voltage to apply the DC voltage to voltage accumulation means, and an inverter that converts a voltage across said voltage accumulation means into an m-phase AC voltage to apply the AC voltage to said armature coil; and a controller that controls said inverter so as to apply an AC control voltage having the same frequency as an induced voltage of said armature coil to said armature coil from said voltage accumulation means via said inverter, and change a phase angle of said AC control voltage to control and bring an output of said magneto generator close to a target value, wherein said controller comprises:

phase angle decision means that changes the phase angle of said AC control voltage to a delayed side when the output of said magneto generator is lower than the target value, and changes the phase angle of said AC control voltage to an advanced side when the output of said magneto generator is higher than the target value, to decide a new phase angle of said AC control voltage;

inverter control means that controls said inverter so as to apply said AC control voltage having the phase angle decided by said phase angle decision means to said armature coil;

limit data map storage means that stores a limit data map providing a relationship between an advanced side limit value and a delayed side limit value within a normal phase angle changing range and a rotational speed of said magnet rotor, said normal phase angle changing range being a changing range of the phase angle of said AC control voltage in which a relationship, such that when the phase angle of said AC control voltage is changed to the delayed side relative to the present phase angle, the output of said magneto generator increases, and when the phase angle of said AC control voltage is changed to the advanced side relative to the present phase angle, the output of said magneto generator decreases, is met between a changing direction of the phase angle of said AC control voltage and a changing direction of the output of the magneto generator;

rotational speed detection means that detects a rotational speed of said magneto generator; and limit data map search means that obtains an advanced side limit value and a delayed side limit value of a phase angle at a rotational speed detected by searching said limit data map for the rotational speed detected by said rotational speed detection means, said phase angle decision means being comprised so as to decide a new phase angle of said AC control voltage only when the phase angle of said AC control voltage is between said advanced side limit value and said delayed side limit value.

5. The generating device according to claim 4, wherein said generating device further comprises a signal generating device of a magnetic flux change detection type having means for changing a magnetic flux when a rotational angle position of said magnet rotor matches a predetermined rotational angle position, and a coil that detects the change of said magnetic flux to generate pulses, said controller further comprises control voltage zero point detection means that regards each zero point of said AC control voltage having the phase angle decided by said phase angle decision means as a target zero point, and detects each target zero point with reference to a timing at which said signal generating device generates a specific pulse, and said inverter control means controls said inverter so as to apply an AC voltage having each zero point matching each target zero point detected by said control voltage zero point detection means to said armature coil from said voltage accumulation means.

* * * * *